United States Patent [19]

Hotta et al.

[11] Patent Number: 5,643,126

[45] Date of Patent: Jul. 1, 1997

[54] LUBRICATING OIL SUPPLY STRUCTURE IN PLANETARY GEAR MECHANISM

[75] Inventors: Takashi Hotta; Kinji Marumo; Michio Kojima, all of Saitama, Japan

[73] Assignee: Honda Giken Kogyo Kabushiki Kaisha, Tokyo, Japan

[21] Appl. No.: 627,673

[22] Filed: Apr. 1, 1996

[30] Foreign Application Priority Data

Mar. 31, 1995 [JP] Japan ..................... 7-06342

[51] Int. Cl.$^6$ ..................... F16H 57/04
[52] U.S. Cl. ..................... 475/159; 475/348; 184/6.12
[58] Field of Search ..................... 475/159, 331, 475/348, 346; 184/6.12, 11.1, 11.2, 13.1

[56] References Cited

U.S. PATENT DOCUMENTS

| | | | |
|---|---|---|---|
| 4,480,492 | 11/1984 | Fujioka et al. | 475/349 X |
| 4,848,177 | 7/1989 | Miura et al. | 184/6.12 X |
| 4,892,011 | 1/1990 | Nishida et al. | 475/159 X |
| 5,131,498 | 7/1992 | Kato et al. | 475/159 X |
| 5,456,476 | 10/1995 | Premiski et al. | 475/159 X |
| 5,472,383 | 12/1995 | McKibbin | 475/159 |
| 5,480,362 | 1/1996 | Tanaka et al. | 475/346 |

FOREIGN PATENT DOCUMENTS 61-48642   3/1986   Japan .

*Primary Examiner*—Charles A. Marmor
*Assistant Examiner*—Peter T. Kwon
*Attorney, Agent, or Firm*—Lyon & Lyon LLP

[57] ABSTRACT

A planetary gear mechanism includes a planetary carrier and pinions rotatably carried on the planetary carrier through pinion shafts. An annular lubricating oil supply member is mounted on a ring gear supporting member which supports a ring gear on its outer periphery and which is rotatable. The lubricating oil supply member has a plurality of fins formed radially thereon. The lubricating oil received within the lubricating oil supply member while submerged in the lubricating oil is scattered by a centrifugal force and supplied to oil reservoirs defined in the adjacent side of the planetary carrier and then from the oil reservoirs via oil passages in the pinion shafts to the needle bearing which supports the pinions. With the above construction, it is possible to effectively supply the lubricating oil to the pinion shafts of the planetary gear mechanism when the planetary is in a fixed position.

14 Claims, 9 Drawing Sheets

5,643,126

LUBRICATING OIL SUPPLY STRUCTURE IN PLANETARY GEAR MECHANISM

BACKGROUND OF THE INVENTION

1. Field of the Invention

The present invention relates to a lubricating oil supply structure in a planetary gear mechanism for supplying a lubricating oil to oil passages which open into ends of a plurality of pinion shafts fixed to a planetary carrier, thereby lubricating pinions which are rotatably carried on outer peripheries of the pinion shafts.

2. Description of the Related Art

A lubricating oil supply structure is conventionally known from Japanese Patent Application Laid-open No. 48642/86, in which in order to lubricate a pinion carried on a planetary carrier of a planetary gear mechanism through a pinion shaft, an oil reservoir for retaining a lubricating oil is provided in a side of the planetary carrier into which an oil passage defined in the pinion shafts open, and a thrust race of a thrust bearing located radially inside the oil reservoir is curved and superposed with the oil reservoir.

The above known lubricating oil supply structure does not include a means for affirmatively supplying the lubricating oil. For this reason, particularly when the planetary carrier is fixed non-rotatably, it is difficult to supply a sufficient amount of lubricating oil to the pinion shaft located at a high position, resulting in a possibility that a seizure of the pinion may be generated.

SUMMARY OF THE INVENTION

Accordingly, it is an object of the present invention to provide a lubricating oil supply structure in a planetary gear mechanism, which is capable of reliably supplying a lubricating oil to the pinion shafts of the planetary gear mechanism.

To achieve the above object, according to the present invention, there is provided a lubricating oil supply structure in a planetary gear mechanism for supplying a lubricating oil to oil passages which open into ends of a plurality of pinion shafts fixed to a planetary carrier, thereby lubricating pinions which are rotatably carried on outer peripheries of the pinion shafts, the structure comprising, oil reservoirs for retaining the lubricating oil, which are formed in a side of the planetary carrier which the oil passages face; a rotatable member rotatably mounted in an opposed relation to the side of the planetary carrier; and an annular lubricating oil supply member having a fin and fixed to the rotatable member such that the lubricating oil supply member is located radially inside the oil reservoirs.

With the above construction, the lubricating oil retained in the lubricating oil supply member having the fin can be scattered by a centrifugal force, and supplied to the oil reservoirs and then through the oil passages opening into the oil reservoirs into the pinion shafts. When a lower portion of the planetary gear mechanism is located under an oil surface, the lubricating is affirmatively pumped up and supplied to the pinion shafts located thereabove.

If a plurality of the fins are disposed radially, the lubricating oil can be supplied to the pinion shafts more effectively.

If a plurality of oil chambers are defined by the plurality of fins to open radially inwardly and toward the side of the planetary carrier, the lubricating oil can be retained in the oil chambers and further effectively supplied to the pinion shafts.

If the rotatable member is a ring gear support member which supports a ring gear around its outer periphery, the lubricating oil supply member can be supported without mounting of a special member.

If openings in the oil chambers opposed to the side of the planetary carrier are closed by a closing member, which has oil bores defined therein to permit the lubricating oil to be ejected therethrough, the lubricating oil retained in the plurality of oil chambers in the lubricating oil supply member can be ejected through the oil bores into the oil reservoirs by a centrifugal force to provide an enhanced lubrication effect.

If a bearing is disposed between the side of the planetary carrier and the rotatable member, and the closing member is clamped between the bearing and the lubricating oil supply member, the relative rotation of the planetary carrier and the rotatable member can be stabilized by the bearing, and the closing member can be supported by utilizing the bearings.

If the oil reservoirs are defined by mounting a guide plate having notches made radially therein to reach the oil passages in the pinion shafts, so that the guide plate abuts against the side of the planetary carrier, and by covering the notches with a lid plate, the oil reservoirs for guiding the lubricating oil to the oil passages in the pinion shafts can be defined by the guide plate and the lid plate.

If a radially inner peripheral portion of the lid plate is bent toward the rotatable member to form a guide portion for guiding the lubricating oil to the oil reservoirs, the lubricating oil scattered from the lubricating oil supply member can be reliably guided to the oil reservoirs.

The above and other objects, features and advantages of the invention will become apparent from the following detailed description of preferred embodiments in conjunction with the accompanying drawings.

DETAILED DESCRIPTION OF THE PREFERRED EMBODIMENTS

A first embodiment of the present invention will now be described with reference to the accompanying drawings.

Figure 1:
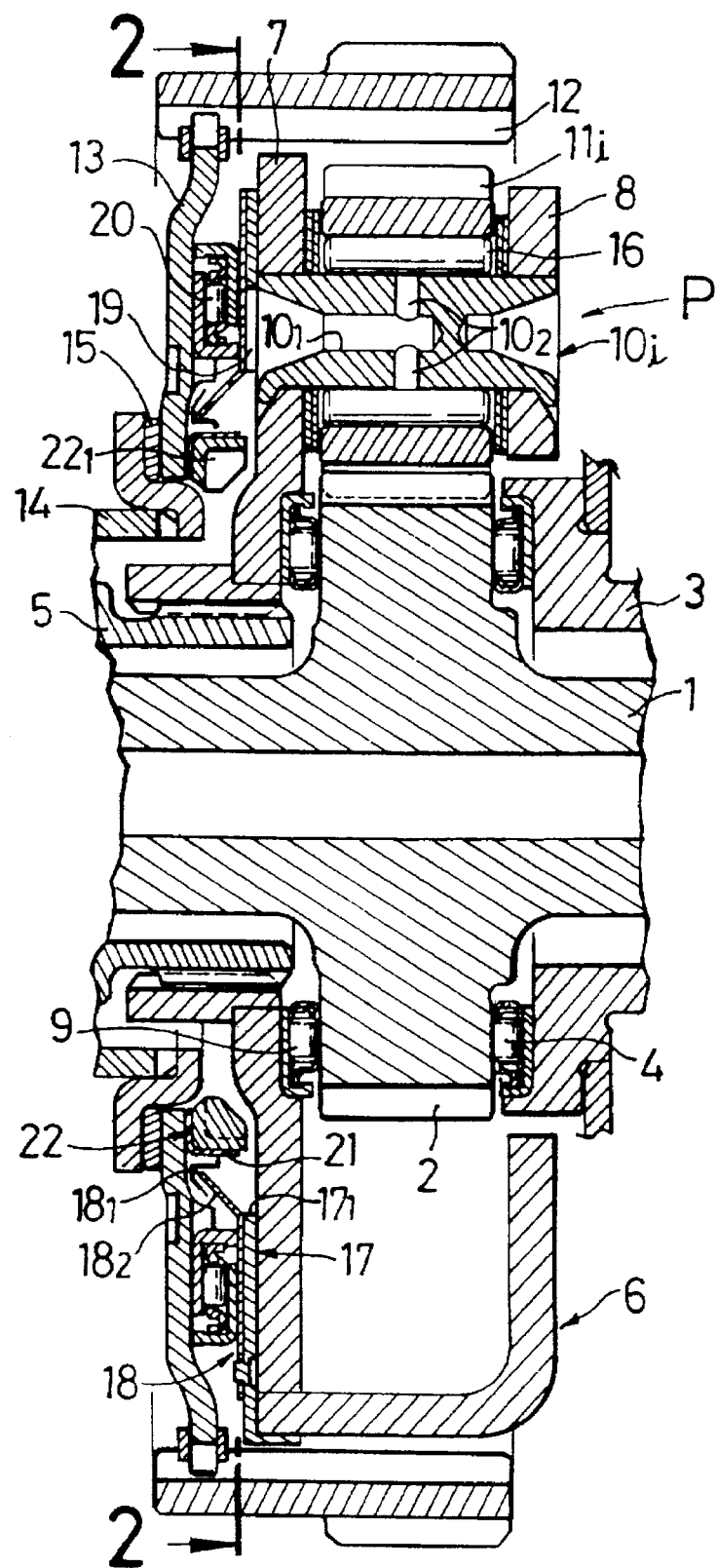
FIG.1 is a vertical sectional view of a planetary gear mechanism which includes a lubricating oil supply structure according to a first embodiment of the present invention.
Figure 2A:
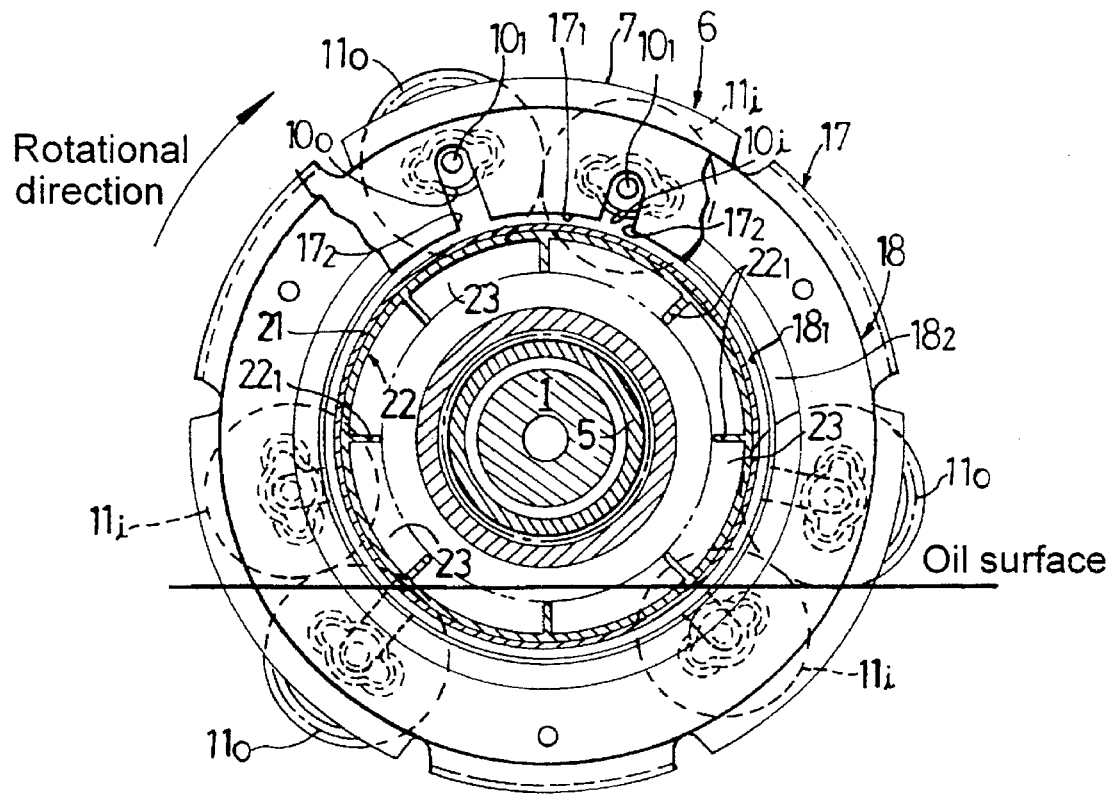
FIGS.2A and 2B are views taken along a line 2—2 in FIG. 1.
Figure 2B:
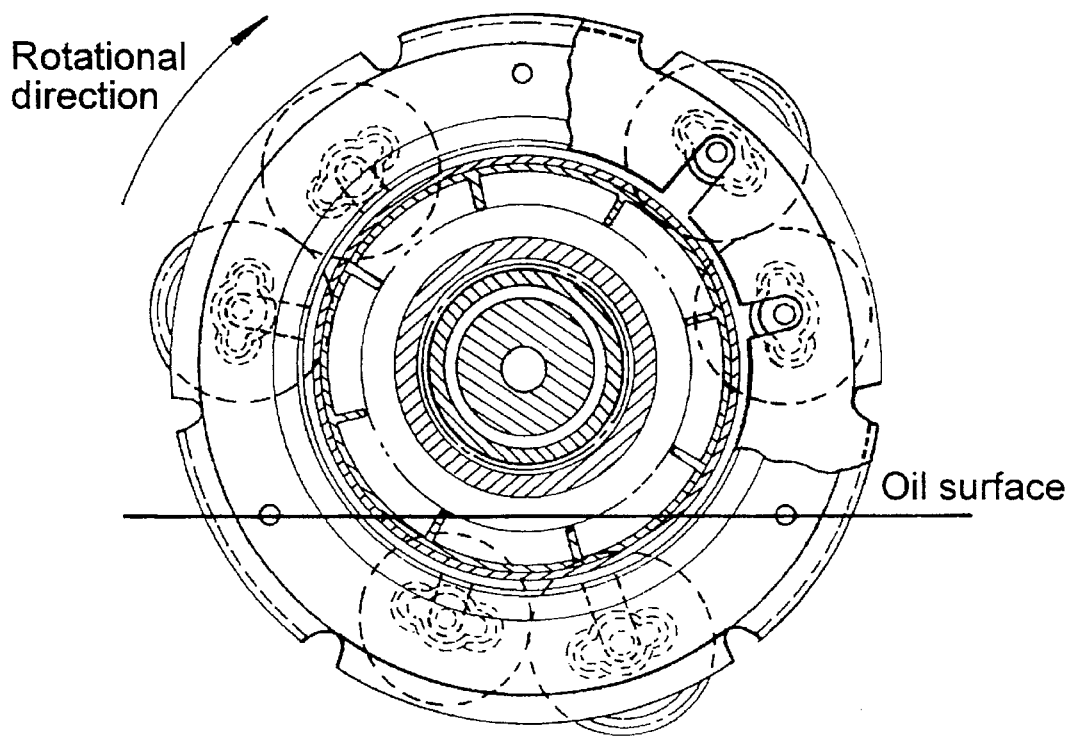

FIGS.1, 2A and 2B show a planetary gear mechanism P used to establish at least one of the gear ratios of a transmission for a vehicle. The planetary gear mechanism P includes a sun gear 2 integrally formed around an outer periphery of a rotary shaft 1. A right side of the sun gear 2 is supported by a thrust bearing 4 which is disposed between such right side and a rotatable sleeve 3 fitted over an outer periphery of the rotary shaft 1. A stationary sleeve 5 is fitted over the outer periphery of the rotary shaft 1 on the opposite side of sun gear 2 as rotatable sleeve 3, and a planetary carrier 6 is spline-coupled to the stationary sleeve 5. The planetary carrier 6 includes a left plate 7 and a right plate 8, and a thrust bearing 9 is disposed between the sun gear 2 and the left plate 7 of the planetary carrier 6.

Six pinion shafts $10o$, $10i$ are mounted to extend between the left and right plates 7 and 8 of the planetary carrier 6. Each of the pinion shafts $10o$ is located at a radially outer position and each of the pinion shafts $10i$ is located at a radially inner position and each outer pinion shaft $10o$ is matched with one of the inner pinion shafts $10i$ to form a pair. Pinions $11o$ and $11i$ are rotatably carried on the pinion shafts $10o$ and $10i$, respectively. The radially inner pinion $11i$ is meshed with the sun gear 2, and the radially outer pinion $11o$ is meshed with a ring gear 12. Further, each pair of the pinions $11o$ and $11i$ are meshed with each other.

The ring gear 12 is fixed to an outer periphery of a disk-like ring gear supporting member 13. An inner periphery of the ring gear supporting member 13 is rotatably supported on a rotatable sleeve 14 fitted over the outer periphery of the stationary sleeve 5, with a thrust washer 15 interposed between the ring gear supporting member 13 and the rotatable sleeve 14.

An oil passage $10_1$ is defined in each of pinion shaft $10o$ and $10i$ and opens into an outer side of the left plate 7. Oil passages $10_2$, $10_2$ extend radially in each pinion shaft from a portion of the oil passage $10_1$ near its bottom and communicate with needle bearings 16 which rotatably support the pinions $11o$ and $11i$ on outer peripheries of the pinion shafts $10o$ and $10I$, respectively.

Figure 3:
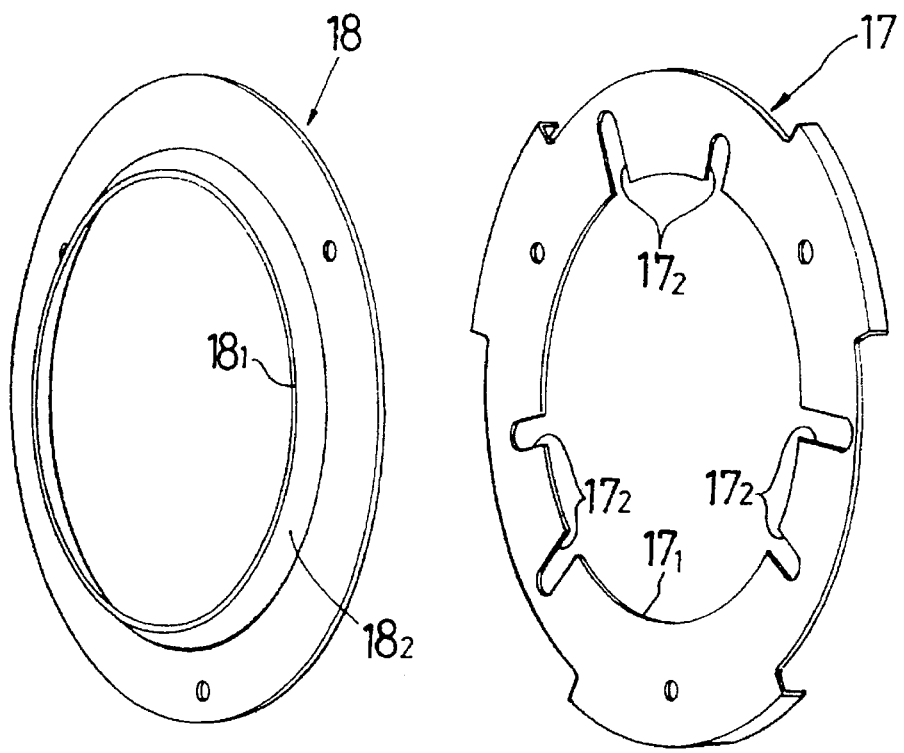
FIG.3 is a perspective view of a guide plate and a lid plate.

As can be seen from FIG.3 in addition to FIGS.1 and 2, a guide plate 17 is superposed on the outer side of the left plate 7 of the planetary carrier 6 and further, a lid plate 18 is superposed on an outer side of the guide plate 17. Six notches $17_2$ are defined in the guide plate 17 and extend radially from a central opening $17_1$ in the guide plate 17. Radially outer ends of the notches $17_2$ reach positions corresponding to the oil passages $10_1$ in the pinion shafts $10o$ and $10i$. Six oil reservoirs 19 are defined by covering the six notches $17_2$ of the guide plate 17 with the lid plate 18 having a central opening $18_1$. A guide portion $18_2$ for guiding a lubricating oil is defined by folding an edge of the central opening $18_1$ in the lid plate 18 toward the ring gear supporting member 13. A thrust bearing 20 is disposed between the lid plate 18 and the ring gear supporting member 13.

Figure 4:
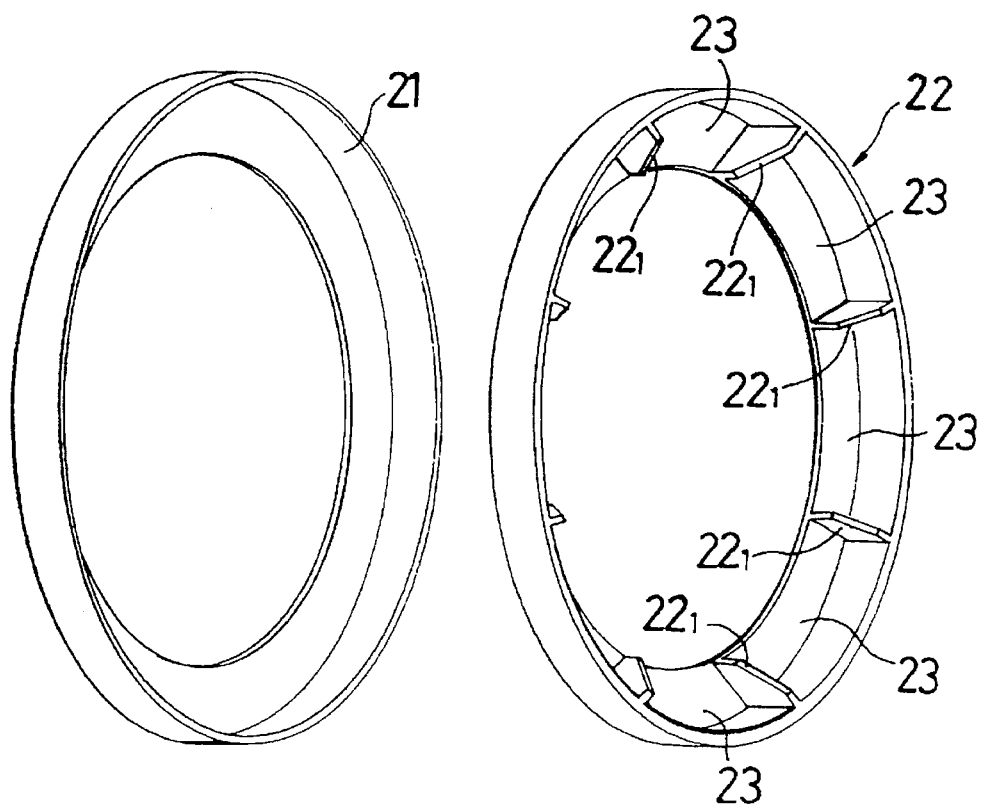
FIG.4 is a perspective view of a lubricating oil supply member and a holder.

As can be seen from FIG.4 in addition to FIGS.1 to 3, an annular holder 21 having an L-shaped section is secured to a right side of the ring gear supporting member 13. A lubricating oil supply member 22 is fitted into and retained in the holder 21. The lubricating oil supply member 22 is an annular member having an L-shaped section which opens radially inwardly and also toward the planetary carrier 6. The lubricating oil supply member 22 has eight oil chambers 23 which are partitioned by eight fins $22_1$ formed radially.

In a spaced defined between the left plate 7 of the planetary carrier 6 and the ring gear supporting member 13, the lubricating oil supply member 22 is disposed at a radially inner location, and the thrust bearing 20 is disposed at a radially outer location. The guide portion $18_2$ of the lid plate 18 extends between the lubricating oil supply member 22 and the thrust bearing 20.

The operation of the first embodiment of the present invention having the above-described construction now will be described.

When the sun gear 2 integral with the rotary shaft 1 is rotated, the pinions $11o$ and $11i$ carried on the stationary planetary carrier 6 are rotated by the sun gear 2. The rotation of the pinions $11o$ and $11i$ is transmitted to the ring gear 12 to rotate the ring gear supporting member 13. A lubricating oil supplied through a space defined between the stationary sleeve 5 and the rotatable sleeve 14 by the oil pump (not shown) is retained in the oil chambers 23 in the lubricating oil supply member 22 rotated in unison with the ring gear supporting member 13; scattered toward the planetary carrier 6 by a centrifugal force; and is guided to the guide portion $18_2$ of the lid plate 18 and supplied to the oil reservoirs 19. The lubricating oil accumulated in a bottom of a casing which accommodates the planetary gear mechanism P therein (see FIGS.2A and 2B) is also pumped up into the oil chambers 23 by the fins $22_1$ of the lubricating oil supply member 22 and supplied upwardly.

The oil scattered from the lubricating oil supply member 22 is guided by the guide portion $18_2$ of the lid plate 18 and supplied to the oil reservoirs 19. Then, this oil is fed from the oil reservoirs 19 via the oil passages $10_1$, $10_2$ and $10_2$ in the pinion shafts $10o$ and $10i$ to the needle bearings 16 supporting pinions $11o$ and $11i$.

Figure 5A:
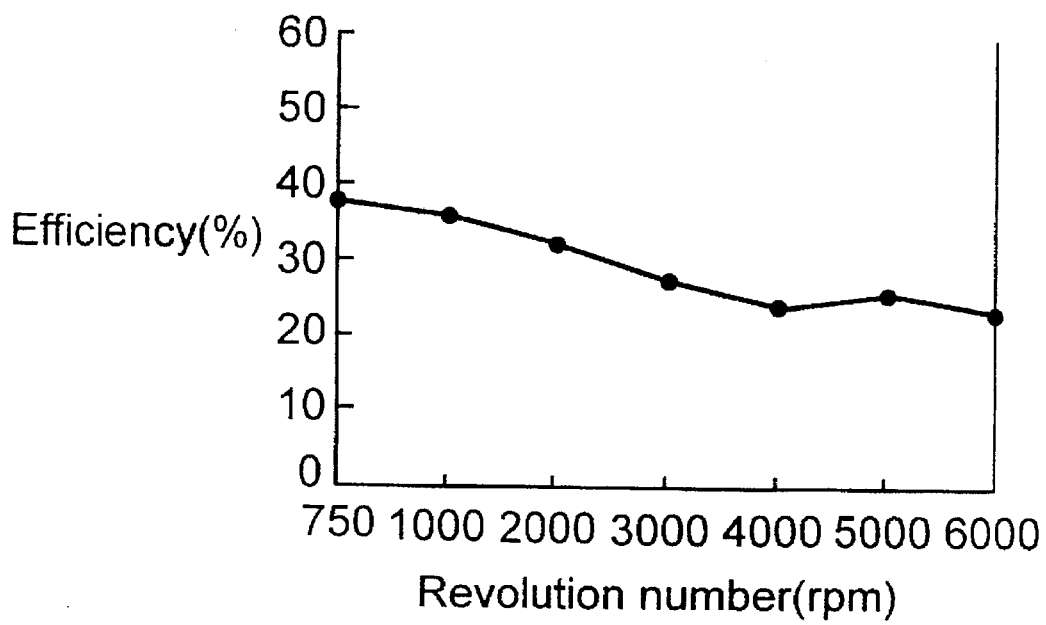
FIGS.5A and 5B are graphs for explaining the lubrication effect.
Figure 5B:
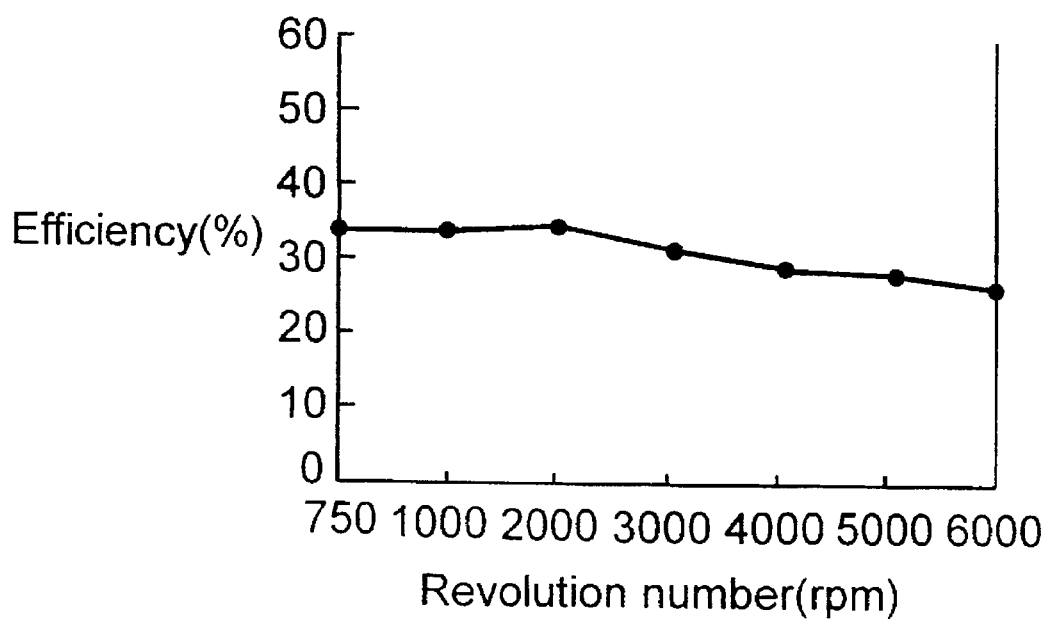
Figure 6:
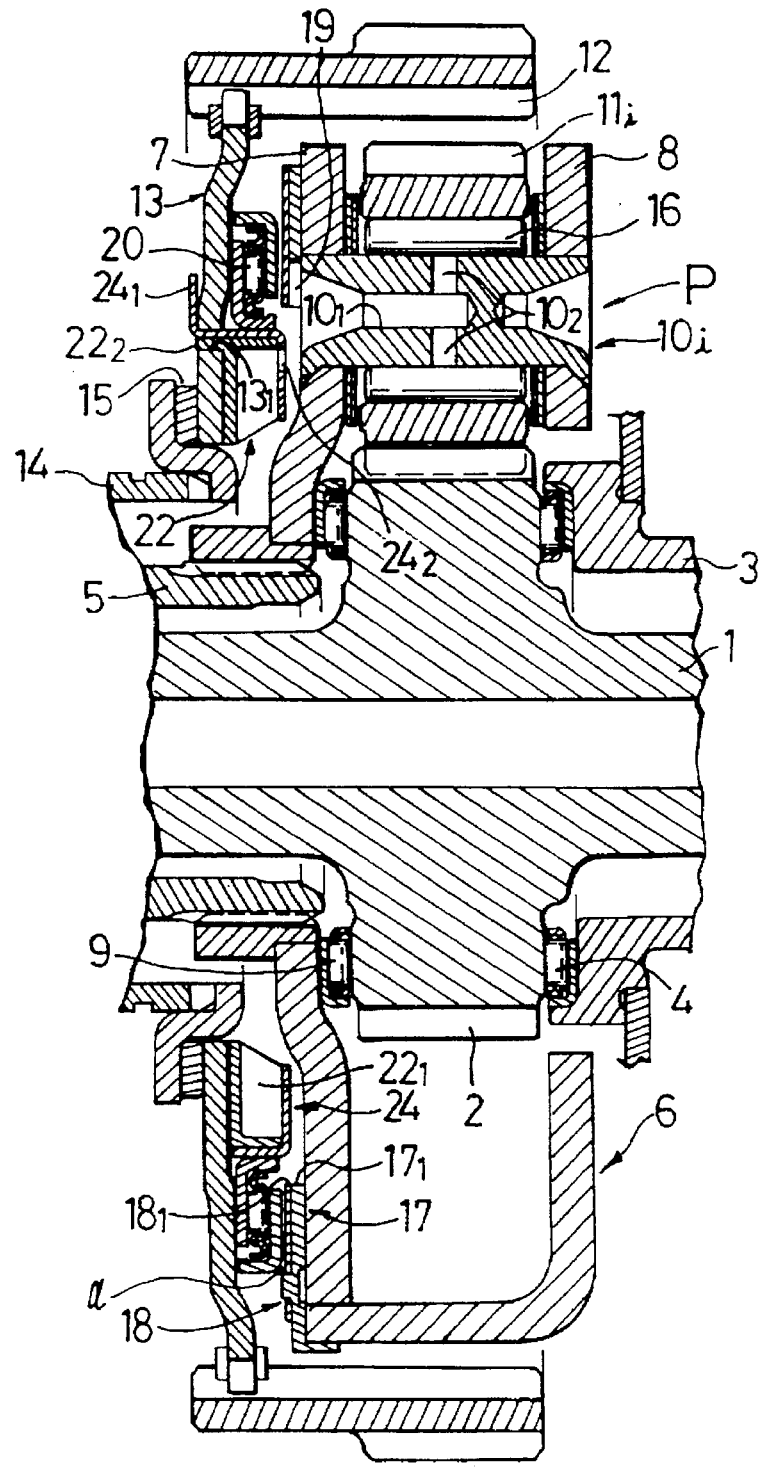
FIG.6 is a view similar to FIG.1, but illustrating a second embodiment of the present invention.
Figure 7:
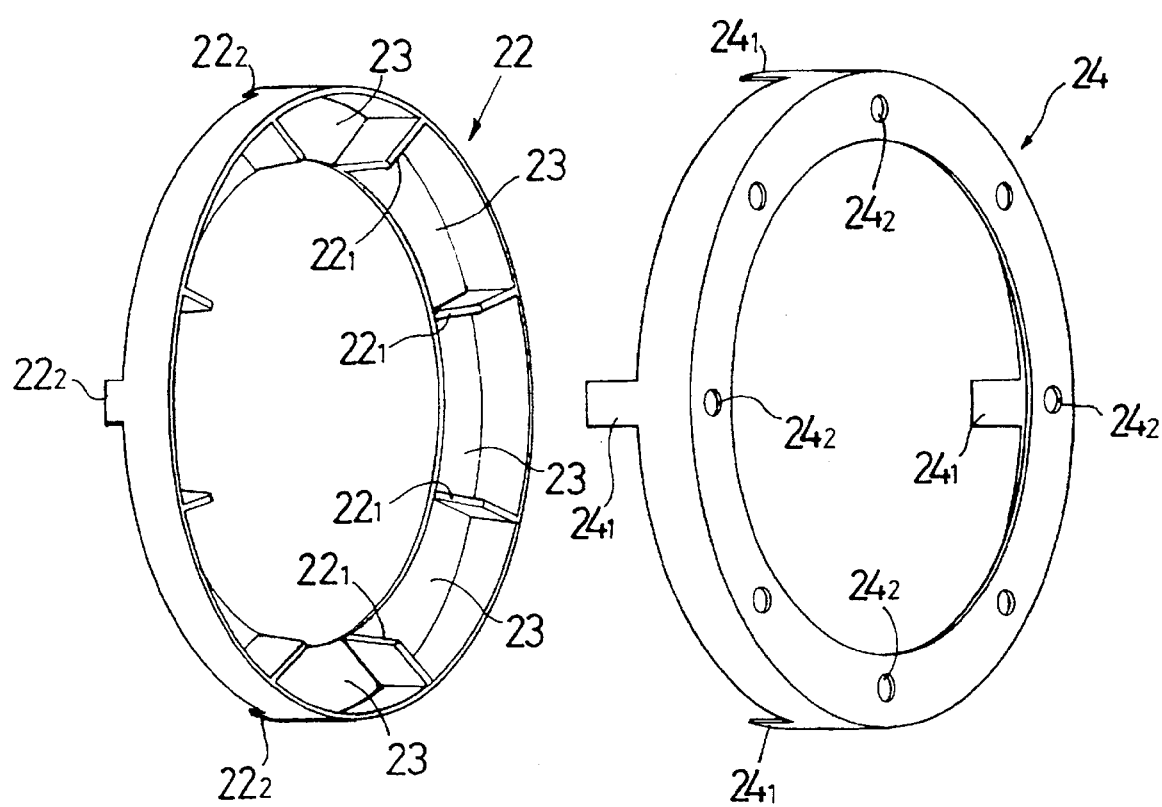
FIG.7 is a perspective view of a lubricating oil supply member and a closing member.
Figure 9A:
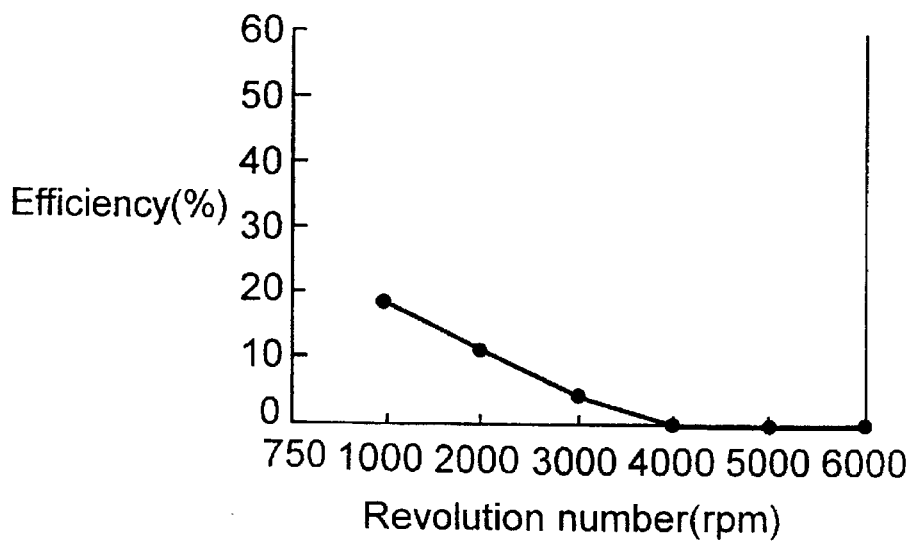
FIGS.9A and 9B are graphs for explaining the lubrication effect in the prior art.
Figure 9B:
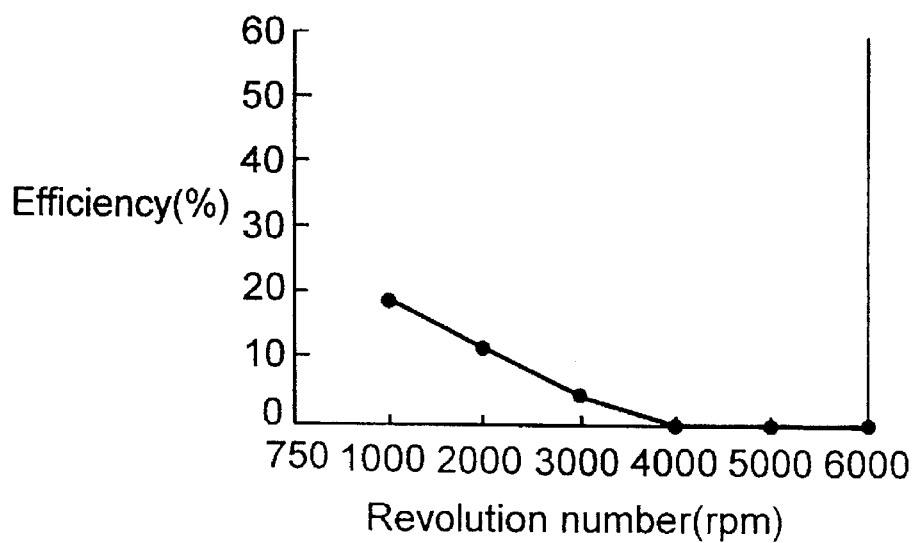
Figure 10A:
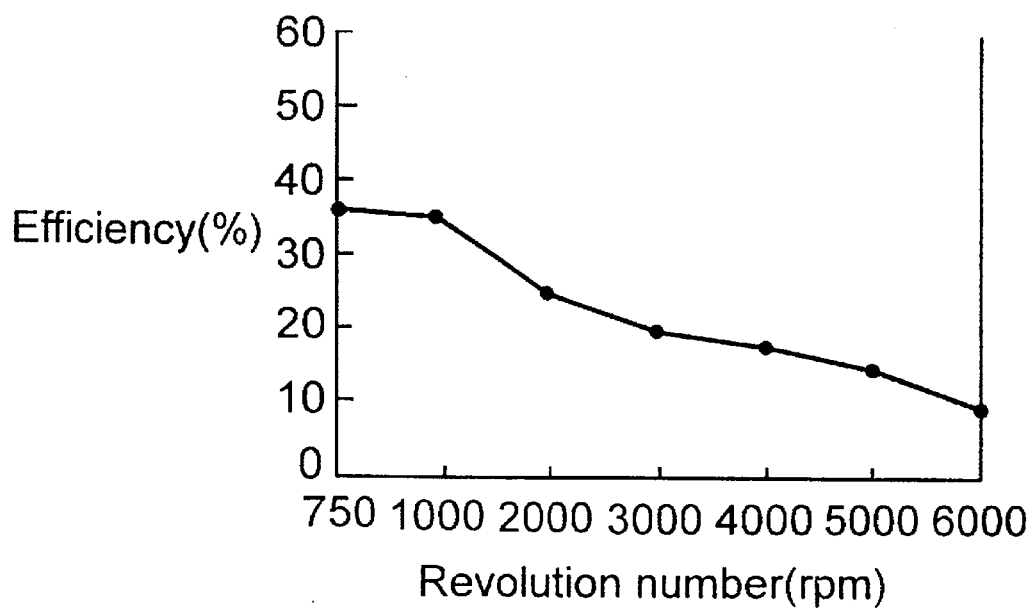
FIGS.10A and 10B are graphs for explaining the lubrication effect in the prior art.
Figure 10B:
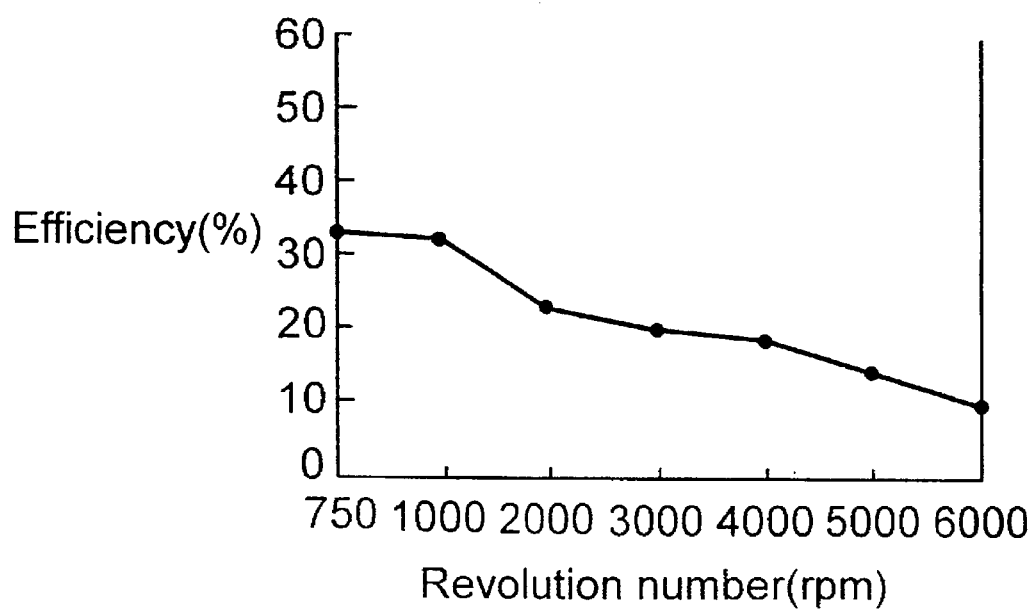

FIGS.5A and 5B are graphs illustrating the lubrication effect in the first embodiment, FIG.5A corresponding to FIG.2A and FIG.5B corresponding to FIG.2B in the operating phase in which the planetary gear mechanism P is fixed and the sun gear 2 and ring gear 12 are rotated. FIGS.9A and 9B are graphs illustrating the lubrication effect provided when the holder 21 and the lubricating oil supply member 22 are removed from the construction in the first embodiment and the guide portion $18_2$ of the lid plate 18 is omitted. FIGS.10A and 10B are graphs illustrating the lubrication effect provided when the holder 21 and lubricating oil supply member 22 are removed from the construction in the first embodiment.

As is apparent from a comparison of these Figures, even in any of the operating phases in which the planetary gear mechanism P is fixed, the lubricating oil supply efficiency is maintained at 23% or more in the entire revolution-number range in the first embodiment and has a remarkable effect particularly in high revolution-number range, as compared with the prior art.

A second embodiment of the present invention will now be described with reference to FIGS.6 to 8B. The components of this second embodiment that are the same as in the first embodiment are identified by the same numerals and will not be described again.

In a planetary gear mechanism P in the second embodiment, four tongues $22_2$ are projectingly provided on a lubricating oil supply member 22 and fitted into and located in support holes $13_1$ made in the ring gear supporting member 13. An annular closing member 24 having an L-shaped section is clamped between an outer peripheral surface of the lubricating oil supply member 22 and an inner peripheral surface of the thrust bearing 20, with its four tongues $24l$ passed through the support holes $13l$ and folded radially outwardly. Thus, the lubricating oil supply member 22 is fixed to the ring gear supporting member 13. The opening in the lubricating oil supply member 22 on the side of the planetary carrier 6 is covered with the closing member 24. Eight oil bores $24_2$ are defined in the closing member 24 covering such opening.

A lubricating oil retained in the oil chambers 23 in the lubricating oil supply member 22 is ejected through the oil bores $24_2$ in the closing member 24 toward the planetary carrier 6 by a centrifugal force and supplied to the oil reservoirs 19. This oil is then supplied from the oil reservoirs 19 via the oil passages $10_1$, $10_2$ and $10_2$ in the pinion shafts 10o and 10i to the needle bearing 16 supporting the pinions 11o and 11i.

In the second embodiment, the lubricating oil from the oil bores $24_2$ is ejected toward the oil reservoirs 19. Therefore, even if the guide portion $18_2$ is not provided on the lid plate, the lubricating oil can be reliably supplied to the oil reservoirs 19 to provided an enhanced lubrication effect.

Figure 8A:
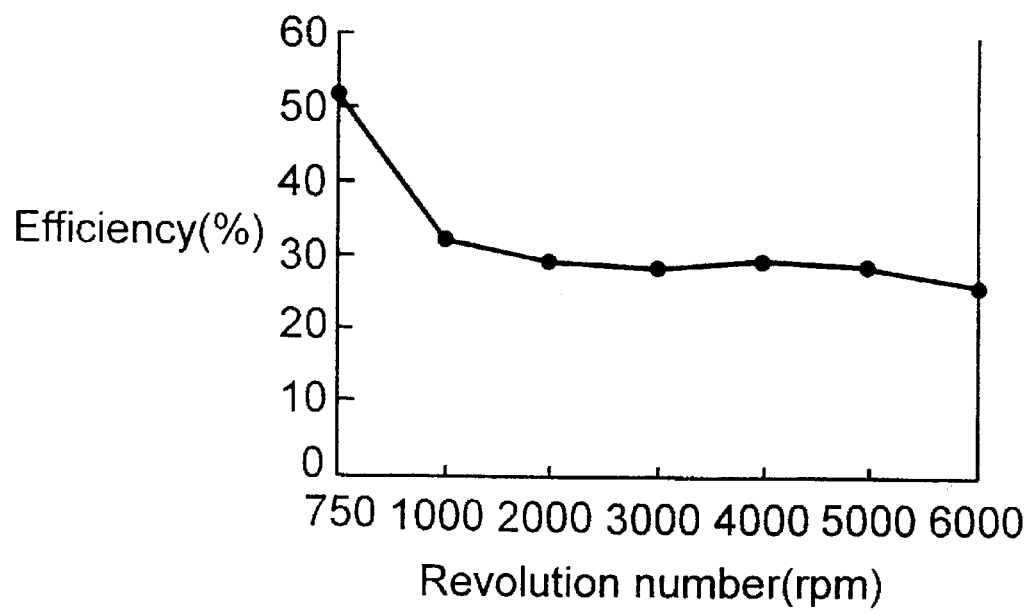
FIGS.8A and 8B are graphs for explaining the lubrication effect in the second embodiment.
Figure 8B:
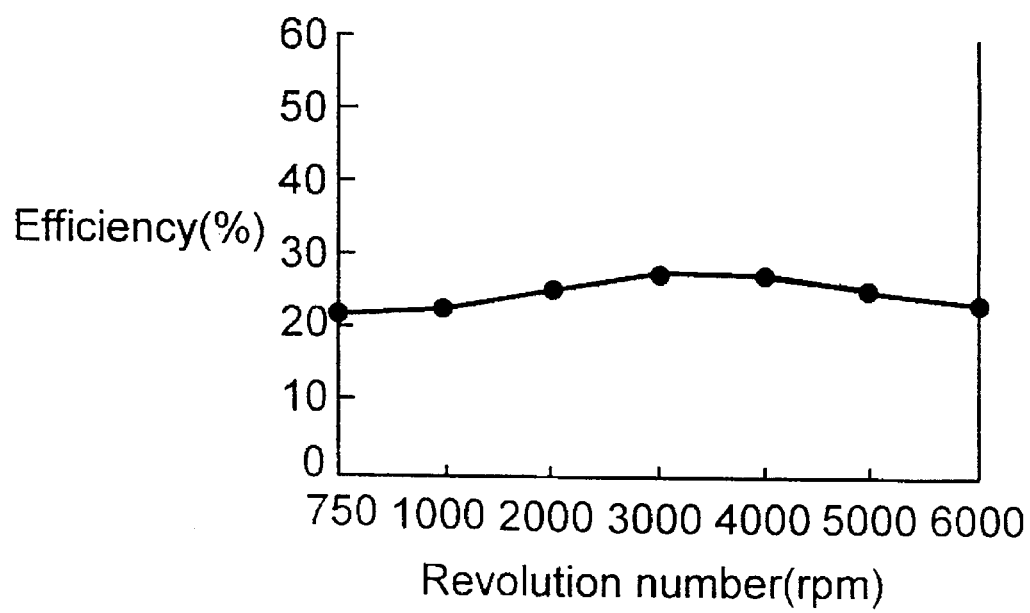

FIGS.8A and 8B are graphs corresponding to the planetary gear positions shown in FIGS. 2A and 2B, respectively, and illustrating the lubrication effect provided when a slight clearance $\alpha$ (0.7 mm) exists between the lid plate 18 and the thrust bearing 20. If the clearance $\alpha$ exists, the lubricating oil is liable to escape, resulting in a reduced lubricating oil supply efficiency. However, as is apparent from the comparison of the graphs in FIGS.8A and 8B with those in FIGS.9 and 10, it can be seen that the high lubricating oil supply effect is insured in the entire range of revolution number in the second embodiment. Of course, when the clearance $\alpha$ does not exist, the lubricating oil supply effect is still higher.

Although the embodiments of the present invention have been described in detail, it will be understood that the present invention is not limited to the above-described embodiments, and various modifications may be made without departing from the spirit and scope of the invention defined in claims.

For example, although the planetary gear mechanism P includes the planetary carrier 6 which is fixed in each of the embodiments, the planetary carrier 6 may be rotatable. In addition, a member other than the ring gear supporting member 13 may be utilized as the rotatable member.

What is claimed is:

1. A lubricating oil supply structure in a planetary gear mechanism for supplying a lubricating oil to oil passages which open into ends of a plurality of pinion shafts fixed to a planetary carrier, thereby lubricating pinions which are rotatably carried on outer peripheries of the pinion shafts, said structure comprising, oil reservoirs for retaining the lubricating oil formed in a side of said planetary carrier to which said oil passages face;

a rotatable member rotatably mounted in an opposed relation to said side of said planetary carrier; and an annular lubricating oil supply member having a fin and being fixed to said rotatable member such that said lubricating oil supply member is located radially inside said oil reservoirs.

2. A lubricating oil supply structure in a planetary gear mechanism according to claim 1, wherein a plurality of fins are provided as said fin, and said fins disposed radially.

3. A lubricating oil supply structure in a planetary gear mechanism according to claim 2, further including a plurality of oil chambers which are formed by the plurality of fins to open radially inwardly and toward said side of the planetary carrier.

4. A lubricating oil supply structure in a planetary gear mechanism according to claim 1, wherein said rotatable member is a ring gear support member which supports a ring gear around its outer periphery.

5. A lubricating oil supply structure in a planetary gear mechanism according to claim 3, wherein said oil chambers opposed to said side of said planetary carrier are closed by a closing member, said closing member being formed with an oil bore through which the lubricating oil is ejected from each oil chamber.

6. A lubricating oil supply structure in a planetary gear mechanism according to claim 5, further including a bearing which is disposed between the side of said planetary carrier and said rotatable member, said closing member being clamped between said bearing and said lubricating oil supply member.

7. A lubricating oil supply structure in a planetary gear mechanism according to claim 1, further including a guide plate having notches made radially therein to reach the oil passages in the pinion shafts, and wherein said oil reservoirs are formed by abutting said guide plate against the side of said planetary carrier, and by covering said notches with a lid plate.

8. A lubricating oil supply structure in a planetary gear mechanism according to claim 7, wherein a radially inner peripheral portion of said lid plate is bent toward said rotatable member to form a guide portion for guiding the lubricating oil to said oil reservoirs.

9. A lubricating oil supply structure in a planetary gear mechanism for supplying a lubricating oil to an oil passage in the end of each of a plurality of pinion shafts fixed to a planetary carrier for lubricating pinions rotatably carried on the pinion shafts, an improvement comprising, a plurality of oil reservoirs formed in a side of said planetary carrier on which said oil passages face with one said oil reservoir located at each said oil passage, each said oil reservoir having a radically inwardly facing opening for receiving lubricating oil; and an annular lubricating oil supply member rotatably mounted in opposed relation to said side of said planetary carrier and inwardly of said oil reservoirs, said annular lubricating supply member having at least one fin for causing the lubricating oil to be lifted from an oil sump during rotation and discharged toward said oil reservoirs.

10. A lubricating oil supply structure in a planetary gear mechanism according to claim 9, wherein a plurality of fins are provided and disposed radially.

11. A lubricating oil supply structure in a planetary gear mechanism according to claim 10, wherein said annular lubricating supply member is formed of two cooperating members to form a plurality of oil chambers by the plurality of fins to open radially inwardly and toward the side of the planetary carrier.

12. A lubricating oil supply structure in a planetary gear mechanism according to claim 11, wherein each of said plurality of oil chambers is provided with a bore facing said side of said planetary carrier and through which the lubricating oil is ejected.

13. A lubricating oil supply structure in a planetary gear mechanism according to claim 9, further including a guide plate having notches extending radially to each of the oil passages in the pinion shafts, said oil reservoirs being formed by abutting said guide plate against said side of said planetary carrier and covering said notches with a lid plate.

14. A lubricating oil supply structure in a planetary gear mechanism according to claim 13, wherein a radially inner peripheral portion of said lid plate is inclined away from the planetary carrier to form a guide portion for guiding the lubricating oil to said oil reservoirs.

* * * * *